Dec. 6, 1955

C. E. ROGERS 2,726,366

FEEDING MECHANISM FOR APPARATUS FOR DETERMINING
MOISTURE CONTENT IN ORGANIC MATERIALS

Filed June 27, 1952

INVENTOR.
CHARLES E. ROGERS

BY *Ely, Fryer & Hamilton*

ATTORNEYS

Dec. 6, 1955

C. E. ROGERS 2,726,366

FEEDING MECHANISM FOR APPARATUS FOR DETERMINING
MOISTURE CONTENT IN ORGANIC MATERIALS

Filed June 27, 1952

*INVENTOR.*
CHARLES E. ROGERS
BY Ely, Frye & Hamilton

ATTORNEYS

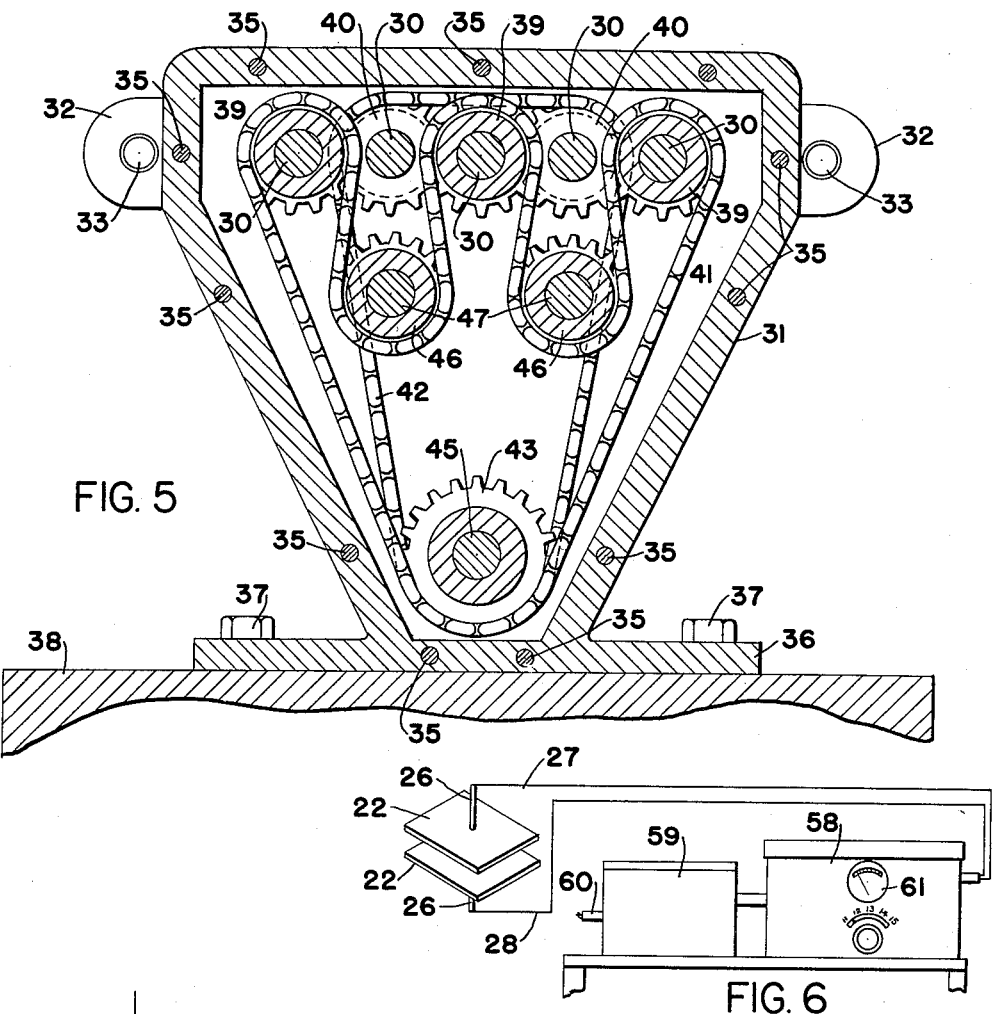
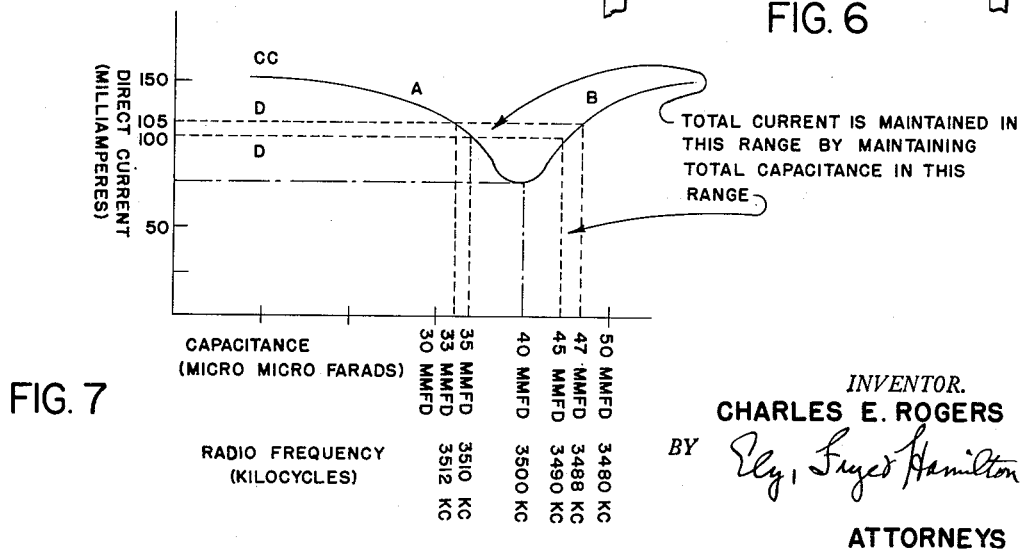

United States Patent Office 2,726,366
Patented Dec. 6, 1955

2,726,366

FEEDING MECHANISM FOR APPARATUS FOR DETERMINING MOISTURE CONTENT IN ORGANIC MATERIALS

Charles E. Rogers, Akron, Ohio, assignor to The Quaker Oats Company, Chicago, Ill., a corporation of New Jersey Application June 27, 1952, Serial No. 295,903

3 Claims. (Cl. 324—61)

The present invention relates generally to apparatus for determining the moisture content of organic material by measuring the variance in capacitive effect of the material passing continuously between two electrodes across which is passed a high frequency current, and this invention relates more specifically to an improved mechanism for feeding the material between the electrodes.

In my copending application, now U. S. Patent No. 2,665,409, issued January 5, 1954 and entitled Method and Apparatus for Determining Moisture Content or Other Variables in Organic Materials, the material being measured is diverted from the main delivery chute and continuously fed into a hopper from the lower end of which it discharges by gravity through a vertical testing chute or throat having electrode plates set in its opposite sides, and from the bottom of the throat the material is deposited on a constant speed belt which returns the material to the main chute. The present invention has to do with an improved feeding mechanism which positively feeds the material being tested at a constant rate between electrode plates in an improved testing throat construction.

The immediate field to which the invention relates is in determining and recording the moisture content of various grains or grain products. In the general field of milling it is important that the products have certain definite moisture contents in order to preserve and store them with a minimum possible loss due to the presence of excessive quantities of moisture. This is particularly true in the cases of all types of meals, flours, and other products of a similar nature. The record of the moisture content is utilized in connection with various driers and humidifiers at some point in the processing of the material to maintain the moisture content at any desired level. However, it will be understood that the invention is not limited to the processing of food materials but may be applied to the preparation, testing or treatment of other organic materials in which the determination of the moisture content is an important consideration.

Due to the gravity feed, the apparatus of Patent No. 2,665,409 has certain limitations with respect to the kinds of materials in which the moisture content can be accurately determined, because of certain characteristics of the materials. For example, feed materials consisting of grain or hulls or fibrous material containing 10 to 30 per cent molasses are inherently sticky, which prevents constant and uniform gravity flow of the material from the hopper through the testing chute. Also, finely milled materials such as flour and cream meal tend to cause bridging in the hopper, even though vibrating means may be employed to agitate the hopper and testing chute. Another disadvantage of the gravity feed is that when relatively coarse materials, such as whole grains, are tested for moisture content the readings vary substantially because of the voids or air pockets between the grains or particles. Such air spaces have no dielectric value or capacitive effect when the material is passing between the electrodes connected in a high frequency resonant circuit, and the measurement of moisture content is accordingly very inaccurate.

Another disadvantage arises when materials of high moisture content are passed through the testing chute disclosed in Patent No. 2,665,409, because the copper electrode plates are set flush with the inner walls of the chute and are constantly in contact with the material passing between the electrodes. When materials having a relatively high moisture content of 20 per cent or more are tested, direct contact of the material with the electrodes tends to cause short circuits in the electronic or high frequency circuit in which the electrodes are connected, resulting in inaccurate meter readings.

The primary object of the present invention is to provide improved mechanism for feeding a constant volume of organic material through an electronic testing throat in such manner as to overcome the various limitations and disadvantages of a gravity feed apparatus, and thereby run a substantially consistent feed giving accurate moisture content determinations in a wide variety of materials. Other objects include the provision of means preventing direct contact with the electrodes in the testing unit, thus avoiding the occurrence of short circuiting by materials of high moisture content.

As explained in Patent No. 2,665,409, by using a high frequency alternating current above about three megacycles per second, variations in readings due to variations in temperature are negligible, and the process and apparatus disclosed therein make possible the direct reading of moisture percentages on a meter. The present improved feeding mechanism can be used in connection with a meter which is associated with a range selector switch adjustable to cause the meter to register within a selected range, and with modified arrangements when the entire range of moisture percentages appears on the meter scale, when the apparatus is connected to a recording device for keeping a permanent record of the moisture content of the material flowing through the apparatus, and where the voltage input to the high frequency system is regulated to maintain uniformity.

A preferred form of the feeding mechanism comprising the present invention is shown and described herein in connection with apparatus disclosed in Patent No. 2,665,409 for determining the moisture content in food materials such as meal or hominy grits, but it will be understood that the invention may be used with modified forms of moisture determining apparatus and in connection with the feeding of various materials, without departing from the scope of the invention as defined in the appended claims.

Referring to the drawings forming part hereof:

Fig. 5 is a transverse sectional view on line 5—5, Fig. 2;

Fig. 6 is a schematic view showing the electrical connections between the meter and the electrodes; and Fig. 7 is a diagram showing the relationship between current, capacitance and radio frequency utilized in determining the moisture content of the material passing between the electrodes.

Figure 1:
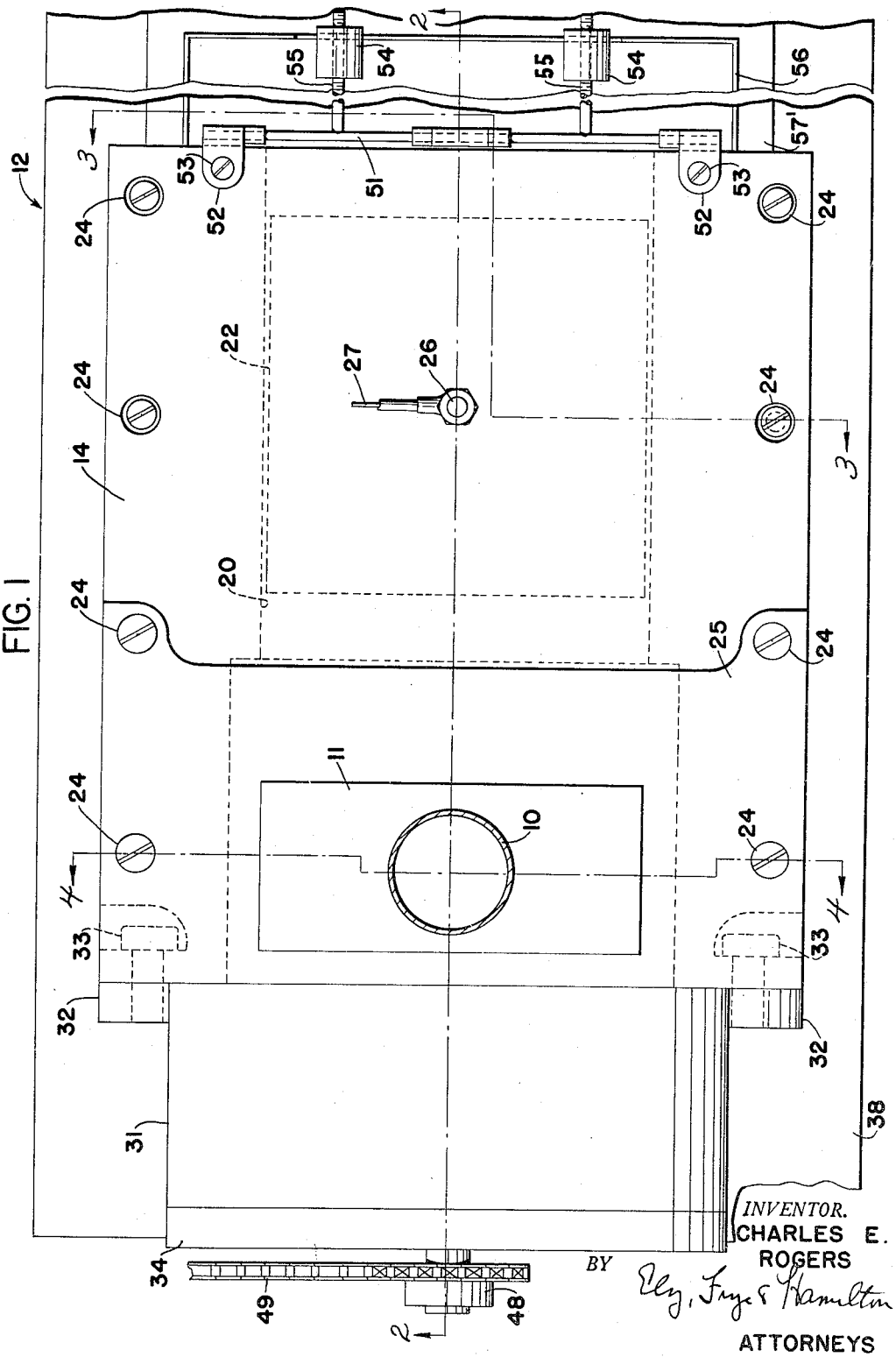
Fig. 1 is a plan view, partly broken away, of the improved feeding mechanism.

In the drawings the lower end of a diverting chute or conduit is indicated at 10, and this conduit is connected at its upper end to the main chute through which the material to be tested passes on its way from the milling room to storage or to packaging machines, for example. The diverting conduit may be arranged in a suitable and well known manner to take out of the main chute a representative cross section of the material therein and conduct it by gravity to the testing unit from which it is returned to the main chute at a lower level.

Figure 2:
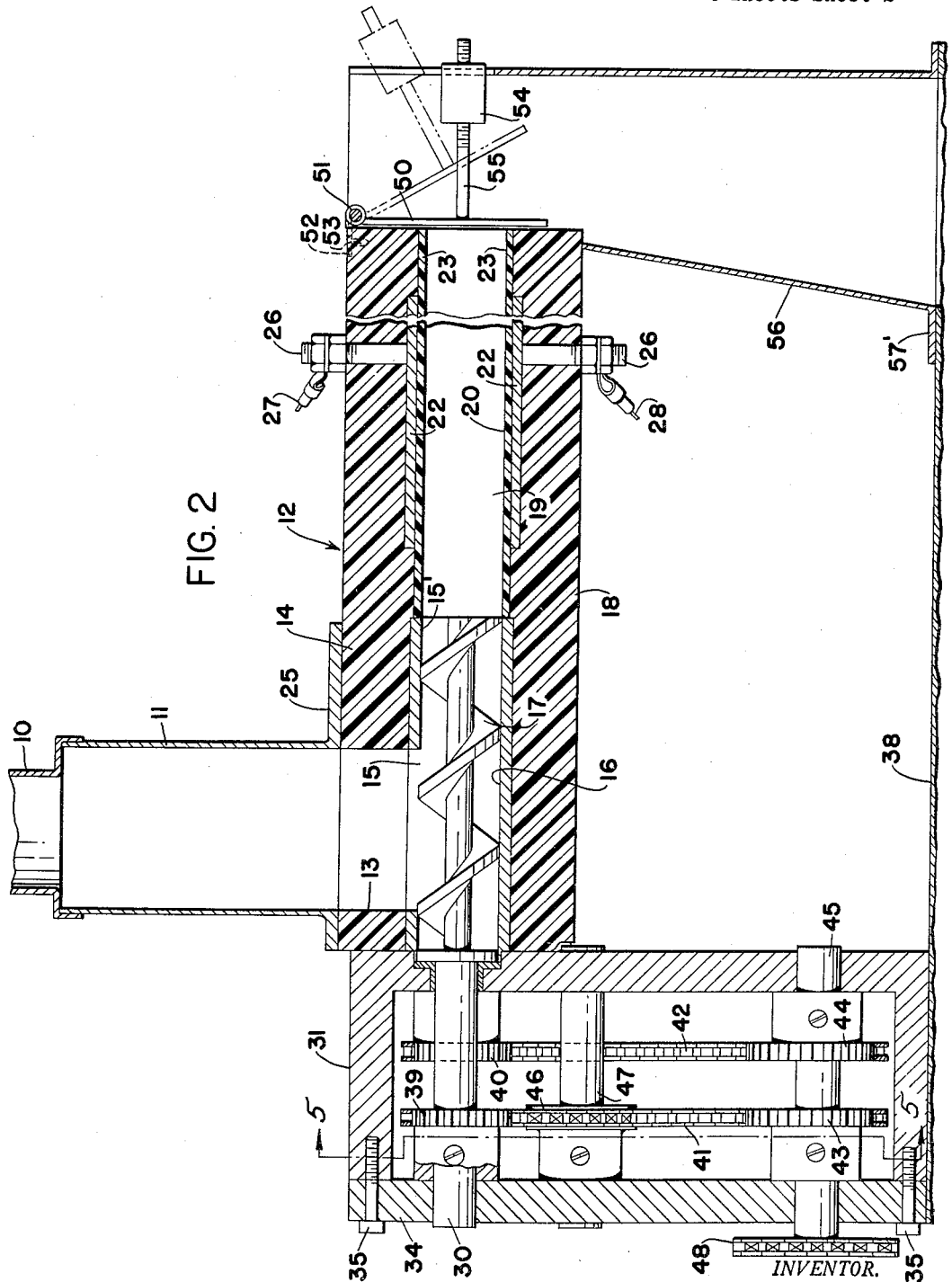
Fig. 2 is a vertical sectional view on line 2—2, Fig. 1.
Figure 3:
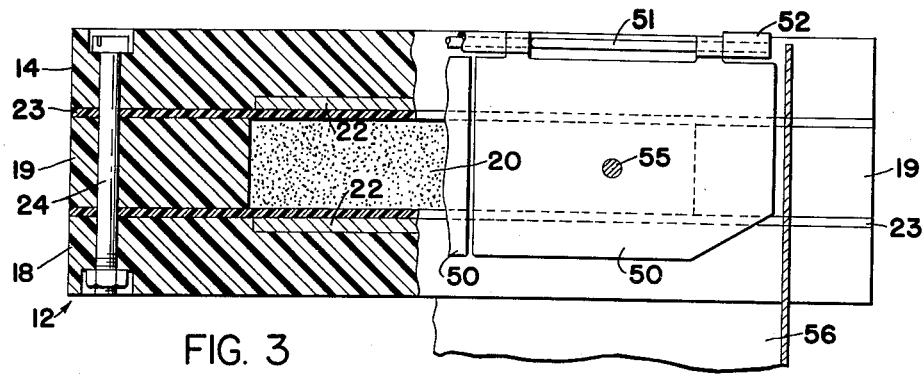
Fig. 3 is a transverse sectional view on line 3—3, Fig. 1.
Figure 4:
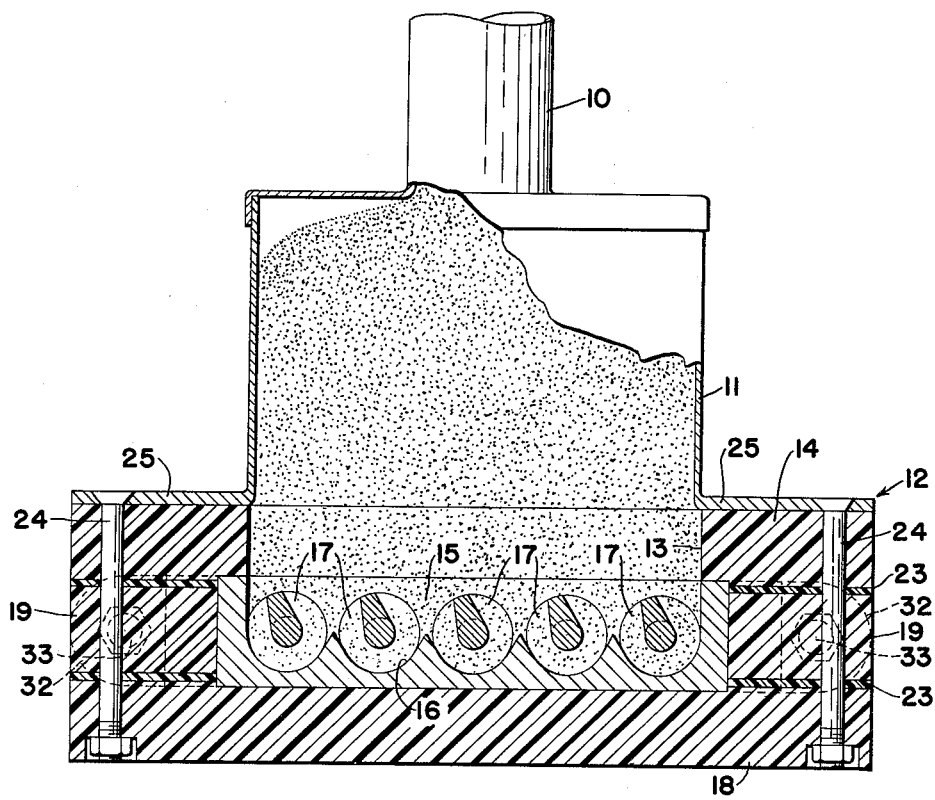
Fig. 4 is a transverse sectional view on line 4—4, Fig. 1.

The conduit 10 discharges into an enlarged chamber or hopper 11 which is preferably rectangular in cross section and, as shown in Figs. 2 and 3, extends upwardly from the testing unit indicated generally at 12. The bottom of the hopper 11 communicates with an inlet opening 13 of preferably identical size and shape in the upper wall 14 of the testing unit, and the opening 13 leads to the feed screw compartment 15 extending horizontally at right angles to the opening 13. As shown in Fig. 4 the feed screw compartment 15 is the same width as inlet opening 13 and hopper 11 but extends longitudinally in both directions of the unit beyond the opening 13. The feed screw compartment 15 may have metal walls, the bottom wall preferably having longitudinally extending parallel grooves or channels 16, one for each feed screw 17. The number of feed screws 17 may be varied as desired, five being shown.

The top wall 14 and bottom wall 18 of the testing unit are preferably plates of transparent plastic material such as Plexiglas, and filler blocks 19 of the same material extend longitudinally between the marginal edge portions of plates 14 and 18 forming a passage or throat 20 of rectangular cross section which is a forward extension of the feed screw compartment 15. This transparent plastic material is desirable because it is electrically non-conducting and because it enables observation of the material during its passage through the testing throat. Other non-conducting materials, whether transparent or not, may be used without departing from the scope of the invention. As shown in Fig. 2, the feed screw compartment 15 has a portion 15' of substantial length extending forwardly of the inlet opening 13 and terminating at the forward ends of the screws 17, and the front end of the compartment communicates with the throat 20. The metal walls of the feed screw compartment 15 are slightly recessed in the upper and lower plates 14 and 18 and the filler blocks 19 abut the sides of the feed screw compartment walls, as shown in Fig. 4, and extend forwardly thereof to form the sides of the throat 20.

Rectangular metal condenser or electrode plates 22 are recessed into the plates 14 and 18 above and below the throat 20 and relatively thin dielectric plates 23 of Plexiglas or other insulating material overlie and protect the electrodes from contact with any material passing through the testing throat 20. The plates 23 preferably extend transversely of the throat the full width of plates 14 and 18, and have rearward extensions located along the sides of the feed screw compartment and between the plates 14 and 18 and filler blocks 19. Thus the plates 14, 18 and 23 and filler blocks 19 may all be bolted tightly together by a series of bolts 24 along each side of the unit, two of the bolts on each side passing through flanges 25 formed on the hopper 11 for securing it to the testing unit.

As shown in Fig. 2 the inner surfaces of the plates 23 overlying the electrodes 22 are arranged to form smooth exteriors of the feed screw compartment portion 15' so that material fed by the screws can flow into and through the throat 20 without restriction, and the material will never be in contact with the metal of the elecrodes. Thus all possibiliy of materials having high moisture content causing short circuits in the high frequency circuit in which the electrodes are connected, with consequent inaccurate meter readings, is avoided. The electrodes 22 are connected to terminal posts 26 extending vertically outward through the plates 14 and 18, and electrically connected in the circuit by suitable conductors 27 and 28.

The rear ends of the feed screws 17 have shafts 30 which extend into and through a drive mechanism housing 31 having ears 32 at its sides attached to the testing unit by bolts 33. Preferably, the rear wall 34 of the housing 31 is detachably secured to the housing by screws 35, and the bottom flange 36 of the housing is mounted by bolts 37 on a suitable support 38. The shafts 30 are suitably journaled in the front and rear walls of housing 31, and within the housing alternate shafts have sprockets 39 and 40 secured thereon for meshing with drive chains 41 and 42 driven by sprockets 43 and 44 respectively on the drive shaft 45. Between the sprockets 39 the drive chain 41 passes around idler sprockets 46 on countershafts 47 so that the sprockets 39 are all driven in the same direction, but this is necessary only where all of the screws are of the same hand. The drive shaft 45 has a sprocket 48 thereon which may be driven by a chain 49 from a suitable motor (not shown).

At the discharge end of the unit one or more gravity gates 50 are provided (two being shown) normally closing off the discharge end of the testing throat 20. These gates 50 may be hinged at the top edge of the plate 14 on a hinge pin 51 mounted in bracket ears 52 secured to the plate by screws 53 (Fig. 1), and are provided with counterweights 54 adjustably mounted on studs 55 so that the amount of resistance or back pressure against the flow of material through the throat may be varied for various materials and to meet certain conditions. It is desirable to provide more than one gate to compensate for the piling effect on one side of the throat due to the screws all turning in the same direction. If alternate screws rotated in opposite directions a single gate could be used satisfactorily. The discharge end of the throat empties into a chute 56 from the lower end of which the material is returned to the main conduit, and the bottom of the chute may be flanged as indicated at 57' for resting on the support 38.

The dimensions of the testing throat are carefully proportioned in relation to the speed and feeding capacity of the feed screws so that the throat 20 is maintained full of moving material as long as sufficient volume is supplied to the feed screws from the hopper 11, and the hopper and supply duct 10 are dimensioned to provide an amount of material in excess of the total feed screw capacity running at normal speed so that the hopper 11 is filled at all times. This insures substantially uniform distribution of material to all the screws because of the relatively large cross sectional area of the hopper, and the closed extension 15' of the feed screw compartment insures the feeding of a uniformly solid column of material to the throat. The gates 50 are calculated to apply sufficient back pressure to the moving column to maintain a uniform density in the throat 20, and they reduce greatly the voids between grains or particles of the material which would otherwise render the moisture content readings inaccurate. This is especially true in the case of larger particles, such as whole grain materials. Thus a constant volume of material at constant density and under constant pressure is maintained flowing through the throat 20.

The dimensions of the testing unit may be varied considerably in accordance with the material being tested. As an example, in an actual installation for testing hominy grits, the testing throat or pasasge 20 is 5⅛ inches wide and ⅞ inches high, and the rate of flow through the throat is about 150 lbs. of material per hour. Because of the positive feed of material from the bottom of the relatively large hopper there is no chance of bridging of the material, and no necessity for any vibrating mechanism because the constantly rotating screws keep the material sufficiently agitated.

Referring to Fig. 6, the conductors 27 and 28 are connected in circuit with radio-frequency generating devices housed in a cabinet 58, preferably including a Pierce type radio frequency oscillator used in conjunction with a quartz crystal for generating a radio frequency voltage of 3500 kilocycles. A power conversion and regulation circuit housed in cabinet 59 is connected to power supply lines 60 and delivers both A. C. current and direct current of uniform voltage to the radio frequency system in cabinet 58. The complete radio-frequency system may be the same as that described in detail in my copending application Serial No. 182,303, previously referred to herein, and since the system is not per se part of this invention the description need not be repeated here.

For the purpose of this invention it is stated that the percentage of moisture in the material passing between the electrodes 22 has a direct effect upon the capacitance of the unit and the resonant frequency varies inversely with the capacitance. Thus by measuring the variations in amplifier plate current caused by variations in capacitance, which in turn are caused by variations in moisture content, and calibrating current variations in terms of moisture content, the percentage of moisture in the material passing through the test throat is constantly determined, and may be indicated on an indicator dial and recorded if desired. Referring to Fig. 7 it is noted that the values given in this diagram for the capacitance-current curve are for purposes of illustration only.

The capacitance-current curve is indicated by the line CC. On the A side of this curve an increase in capacitance (micromicrofarads—mmfd) causes a decrease in the direct current (milliamperes) and on the B side of the curve an increase in capacitance causes an increase in current. At the point C, the maximum resistance in the amplifier tubes in the system causes the minimum current. By maintaining the total capacitance in the range between the dotted lines D—D, the total current is maintained in this range where the curve is steepest and the variations most pronounced. The total capacitance is composed of several condensers and test cell plates plus the moisture content of the material passing between the electrodes.

When the inductance and capacitance values are of a certain combination in the amplifier circuit they will resonate or be in tune with the radio-frequency voltage of 3500 kilocycles, and when this combination produces a perfectly resonant circuit the internal resistance of the amplifier tubes is at the maximum point C and with a fixed D. C. plate voltage, the plate current reaches a minimum. Any change in capacitance from this combination of values will produce a decrease in the internal resistance of the amplifier tubes and a corresponding increase in current. When the device is operating, the only variable in capacitance is caused by variations in moisture content of the material passing between the electrodes, and if the values of the capacitance in the system including that of the moisture content are such as to place the circuit in operation on a section of the B side of the curve CC between the lines D—D, any increase in moisture content and hence in capacitance will produce an increase in amplifier plate current, and any decrease in capacitance will produce a decrease in amplifier plate current. If the values of capacitance in the system are such as to place the circuit in operation on the A side of the curve, the relation of capacitance and plate current will be reversed.

Thus the variations of direct current in the amplifiers in milliamperes are a measure of the variations in moisture content of the material, and may be shown a milliammeter indicated at 61 in Fig. 6.

In the processing of hominy grits, for example, it is desirable to maintain the moisture content close to 14 per cent, and the initial setting of the system is such that the measurements of plate current equivalent to 14 per cent moisture content will be taken within the zone D—D of the capacitance curve. In the processing of other products the setting will necessarily be varied to cause the milliammeter to function within the desired range.

The present improved feeding mechanism can be utilized successfully to feed a wide variety of materials at a constant rate and at substantially constant density, including fibrous materials, coarse and fine materials, and inherently sticky materials. This is due to the positive feed and self-agitation provided by the feed screws in cooperation with the constant back-pressure supplied by the gates. Moreover, because of the protecting plates 23 which cover the electrodes, materials of unusually high moisture content can be tested and the moisture content accurately measured.

It is to be understood that variations and modifications of the improved feeding mechanism, other than those suggested herein, may be made in the apparatus comprising the invention, without departing from the scope of the invention as defined in the appended claims.

What is claimed is:

1. Apparatus for determining the moisture content of fluent material comprising, in combination with a system for measuring the electrical capacitance of said material, said system including a substantially rectangular condenser having opposed electrode plates connected in a high-frequency alternating current circuit, apparatus for providing a constant volume confined stream of said fluent material under a constant pressure head comprising a hopper for supplying said fluent material, walls forming a substantially rectangular area communicating with said hopper and connecting said hopper with said condenser, a plurality of feed screws within said rectangular area for moving said fluent material from said hopper through said condenser, said screws having axes of rotation in the same plane and being spaced apart from each other so as to provide open interstitial portions between said screws, means driving said screws at constant speed, and a chute receiving fluent material which has passed through said condenser.

2. Apparatus for determining the moisture content of fluent material comprising, in combination with a system for measuring the electrical capacitance of said material in terms of milliamperes, said system including a substantially rectangular condenser having opposed electrode plates connected in a high-frequency alternating current circuit and dielectric plates covering said electrode plates and contacting fluent material present between said plates, apparatus for providing a constant volume confined stream of said fluent material under a constant pressure head comprising a hopper for supplying said fluent material, walls forming a substantially rectangular area communicating with said hopper and connecting said hopper with said condenser, a plurality of feed screws within said rectangular area for moving said fluent material from said hopper through said condenser, said screws having axes of rotation in the same plane and being spaced apart from each other so as to provide open interstitial portions between said screws, means driving said screws at constant speed, and a chute receiving fluent material which has passed through said condenser.

3. Apparatus for determining the moisture content of fluent material comprising, in combination with a system for measuring the electrical capacitance of said material in terms of milliamperes, said system including a substantially rectangular condenser having opposed electrode plates connected in a high-frequency alternating current circuit and dielectric plates covering said electrode plates and contacting fluent material present between said plates, apparatus for providing a constant volume confined stream of said fluent material under a constant pressure head comprising a hopper for supplying said fluent material, top, bottom and sidewalls forming a substantially rectangular area communicating with said hopper and connecting said hopper with said condenser, a plurality of feed screws within said rectangular area for moving said fluent material from said hopper through said condenser, said screws having axes of rotation in the same plane and being spaced apart from each other and from the top and sidewalls of said rectangular area so as to provide open interstitial portions above said plane of the axes of rotation, means driving said screws at constant speed, and a chute receiving fluent material which has passed through said condenser.

References Cited in the file of this patent

UNITED STATES PATENTS

| Number | Name | Date |
|---|---|---|
| 2,016,920 | Fisher et al. | Oct. 8, 1935 |
| 2,043,241 | Eyer | June 9, 1936 |
| 2,266,114 | Bartlett | Dec. 16, 1941 |
| 2,277,953 | Christensen | Mar. 31, 1942 |
| 2,519,089 | Whitaker | Aug. 15, 1950 |

FOREIGN PATENTS

| Number | Country | Date |
|---|---|---|
| 508,512 | Germany | Sept. 27, 1930 |
| 636,316 | Germany | Oct. 7, 1936 |